United States Patent
Barnat

(10) Patent No.: US 9,539,655 B2
(45) Date of Patent: Jan. 10, 2017

(54) METHOD OF MACHINING A TURBINE DISK SLOT

(75) Inventor: Krzysztof Barnat, Berlin, CT (US)

(73) Assignee: United Technologies Corporation, Farmington, CT (US)

( * ) Notice: Subject to any disclaimer, the term of this patent is extended or adjusted under 35 U.S.C. 154(b) by 956 days.

(21) Appl. No.: 12/692,914

(22) Filed: Jan. 25, 2010

(65) Prior Publication Data

US 2011/0182685 A1   Jul. 28, 2011

(51) Int. Cl.
*B23P 15/04* (2006.01)
*B23C 3/30* (2006.01)
*B23C 5/14* (2006.01)
*B23P 13/02* (2006.01)

(52) U.S. Cl.
CPC . *B23C 3/30* (2013.01); *B23C 5/14* (2013.01); *B23P 13/02* (2013.01); *B23C 2220/366* (2013.01); *Y10T 29/49316* (2015.01); *Y10T 29/49325* (2015.01); *Y10T 409/30* (2015.01); *Y10T 409/303752* (2015.01)

(58) Field of Classification Search
CPC ........ B23C 3/30; B23C 5/14; B23C 2220/366; B23P 13/02; Y10T 29/49325; Y10T 29/49316; Y10T 409/30; Y10T 409/303752

USPC ............. 29/889.2, 889.22, 889.23, 557, 558; 416/219 R; 409/64, 131, 244
See application file for complete search history.

(56) References Cited

U.S. PATENT DOCUMENTS

| | | | |
|---|---|---|---|
| 4,294,568 A * | 10/1981 | Lipowsky et al. ............. 409/244 |
| 5,430,936 A | 7/1995 | Yazdzik, Jr. et al. |
| 5,593,282 A | 1/1997 | Krueger |
| 5,676,505 A | 10/1997 | Gauss et al. |
| 5,931,616 A | 8/1999 | Daub |
| 6,244,822 B1 | 6/2001 | Sinclair et al. |
| 6,302,651 B1 | 10/2001 | Kildea et al. |
| 6,767,168 B2 | 7/2004 | Miller |
| 6,883,234 B2 | 4/2005 | Packman et al. |
| 7,007,382 B2 * | 3/2006 | Mantel .......................... 29/889.2 |
| 7,303,461 B1 | 12/2007 | Campomanes et al. |
| 7,473,160 B1 * | 1/2009 | Gerstner ............................ 451/7 |
| 7,699,685 B1 * | 4/2010 | Gerstner ............................ 451/7 |
| 2009/0148296 A1 | 6/2009 | Barnat et al. |
| 2009/0214351 A1* | 8/2009 | Guo .......................... 416/219 R |
| 2011/0182685 A1* | 7/2011 | Barnat .......................... 409/131 |

* cited by examiner

*Primary Examiner* — Ryan J Walters
(74) *Attorney, Agent, or Firm* — Carlson, Gaskey & Olds, P.C.

(57) ABSTRACT

A method of manufacturing a turbine disk includes the steps of machining an initial slot using a cutting tool and machining intermediate and semi finished slot using a form tool that forms surfaces of the slot except for the bottom surface. A final finishing step utilizes a cutting tool that includes a shape that forms the bottom portion of the disk slot.

12 Claims, 6 Drawing Sheets

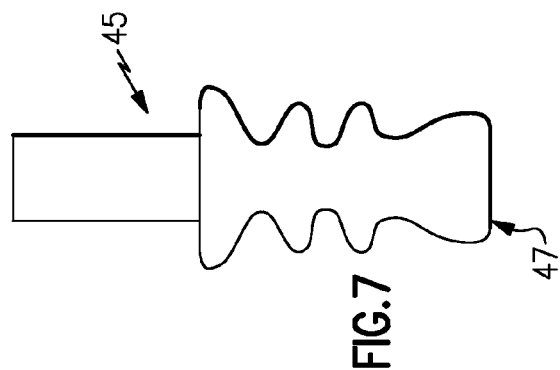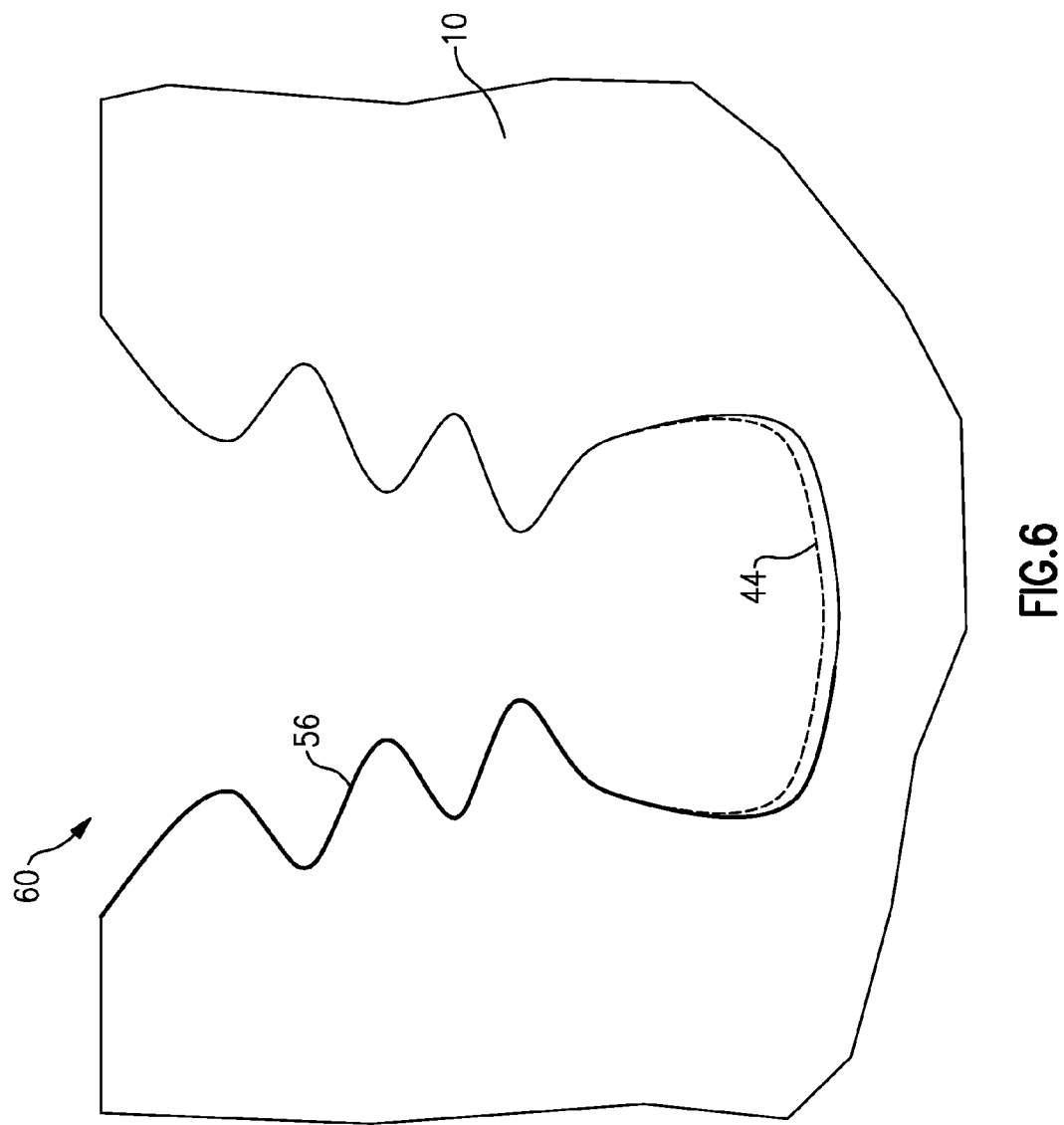

METHOD OF MACHINING A TURBINE DISK SLOT

BACKGROUND

This disclosure generally relates to a method of forming a slot within a turbine disk for a gas turbine engine.

A gas turbine engine has a turbine disk to which are attached turbine blades. The turbine blades are seated in slots on the periphery of the turbine disk. Each slot has an interlocking shape to match a shape on a root of the turbine blade.

The turbine disk slot is commonly manufactured utilizing a broaching process. A broaching process utilizes a broach machine having long rails with cutting surfaces disposed on the rails. The cutting surfaces are run across the outside edge of the turbine disk to form each slot. Because of the numerous variations in slot designs, a rail used in the broach machine must be specially manufactured for each specific design. This process is both expensive and time consuming. Further, milling and grinding processes can be utilized but are also limited in the slot geometries that can be produced.

SUMMARY

A disclosed method of manufacturing a turbine disk includes forming an initial slot within a turbine disk followed by removing material from within the slot to form an intermediate slot. The formation of the intermediate slot is followed by a partial finishing step that finishes a portion of the slot not including the bottom surface of the slot. The final step of the disclosed method provides for the completion of the finished slot by machining the bottom surface with a cutting tool.

These and other features disclosed herein can be best understood from the following specification and drawings, the following of which is a brief description.

BRIEF DESCRIPTION OF THE DRAWINGS

FIG. 6 is a schematic view of an example partially finished slot.

FIG. 7 is a schematic view of an example tool for forming the partially finished slot.

DETAILED DESCRIPTION

Figure 1:
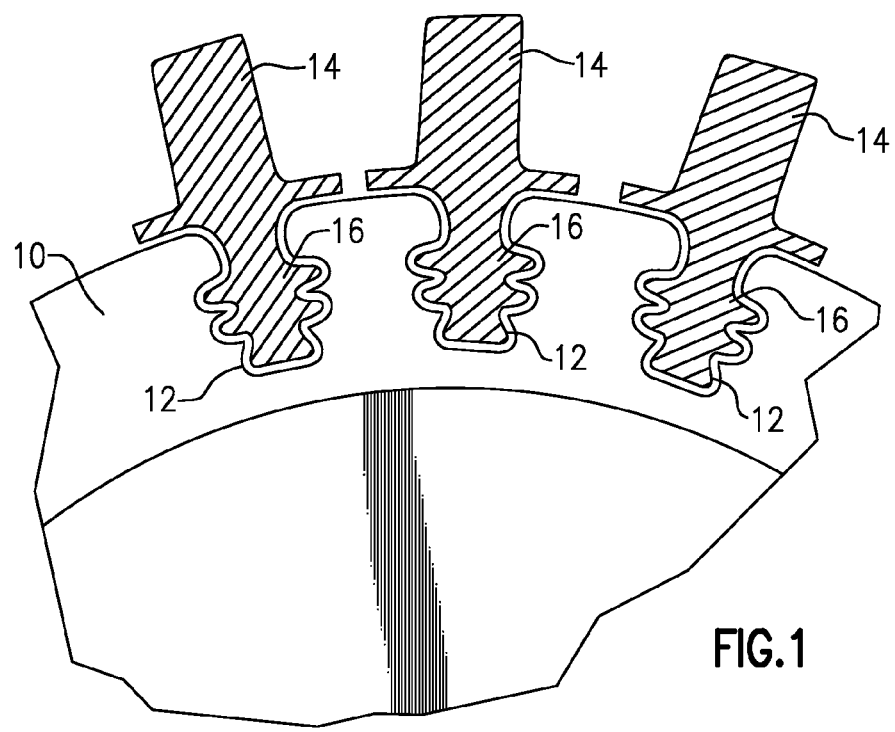
FIG. 1 is a schematic view of a rotor including a plurality of turbine blades disposed within a corresponding plurality of slots.

Referring to FIG. 1, a rotor 10 includes a plurality of slots 12. The plurality of slots 12 includes a profile that matches a profile on a root section 16 of a turbine blade 14. The slot profile includes a shape that provides for securement of the turbine blades 14 within the rotor 10. The example profiles include a complex shape that matches the corresponding root 16 on each of the plurality of turbine blades 14 that is determined to hold the turbine blade in place during operation. The complex shapes provided in the slots 12 and corresponding root 16 are machined to provide a desired finish within acceptable tolerances.

A milling tool including a profiled surface that corresponds to the desired final surface of the machine slot can be utilized to form the slots 12. A grinding operation could also be utilized to provide the desired shape. Grinding operations utilize a form tool including an abrasive surface to remove material and form the slot 12. Each of the described machining processes has limits as to the type of profile that can be generated. Accordingly, the disclosed example process provides for a method of utilizing the benefits associated with each of these processes.

Figure 2:
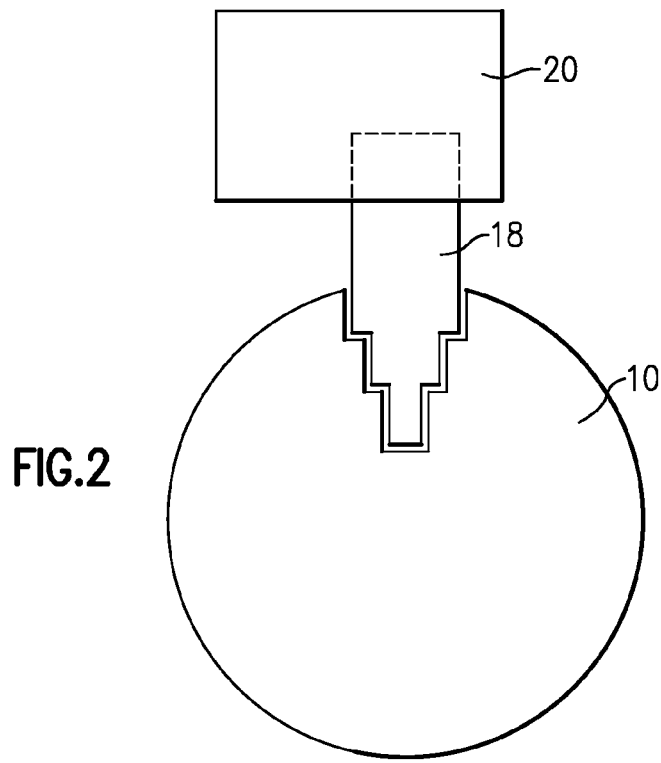
FIG. 2 is a schematic representation of a machining process forming a rough slot within the example rotor.

Referring to FIG. 2, the example process begins with an initial forming of the slot 12. This initial forming can be accomplished through the use of a form tool 18. The example form tool 18 is driven by a machine 20. Form tool 18 forms a rough shape of the slot 12. The example form tool 18 is driven about an axis normal to the driven path through the slot 12. However, the initial slot could be formed utilizing other tools and methods. For example, a stepped grinding wheel could be utilized to form the slot 12. Further, the rotor 10 could be formed with a roughed in initial slot form.

Figure 3:
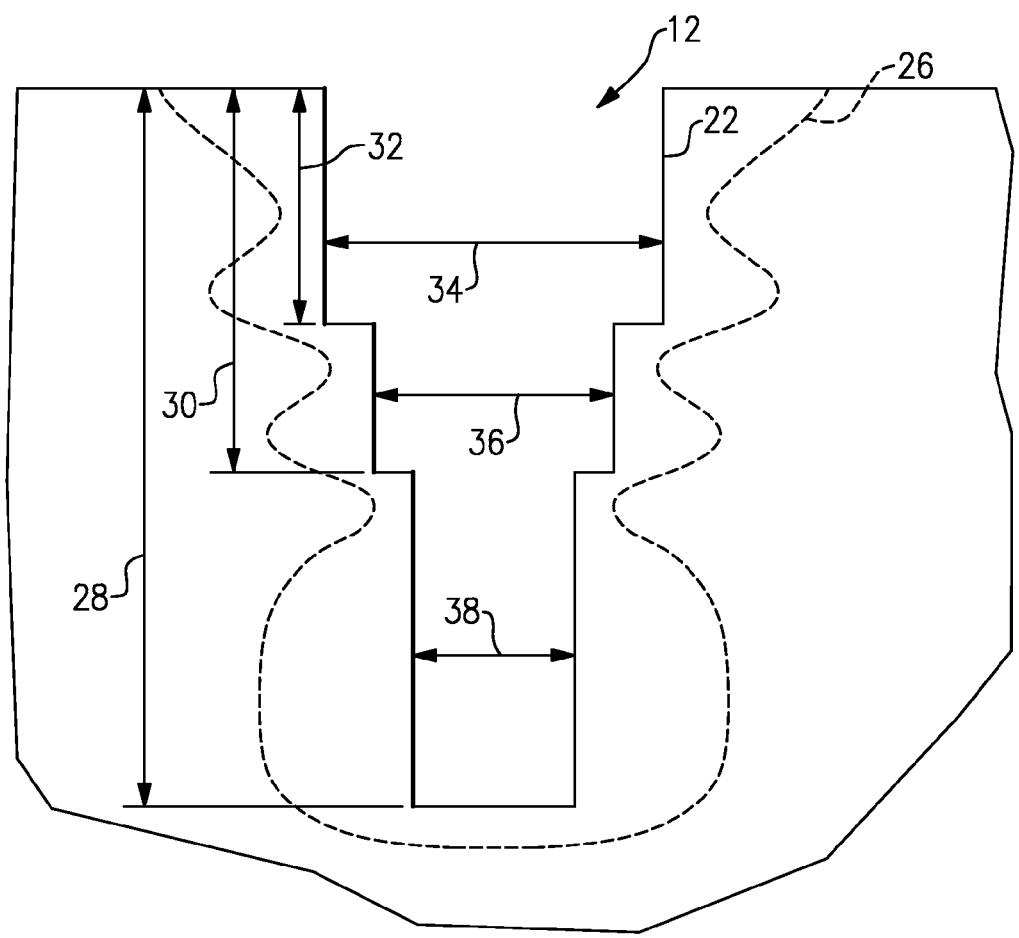
FIG. 3 is a schematic view of the roughed in slot.

Referring to FIG. 3, the initial slot is shown milled or formed to an initial profile 22 that includes a series of rectangular shapes that provide a starting point to begin forming the desired completed geometry of the slot 12. The example profile 22 includes a depth 28 and a series of ledges at different depths. The greatest depth 28 includes a width 38 that is the smallest width in the initial profile 22. Moving upward from the smallest width 38 is a larger width 36 and still a larger width 34 that are sequentially shallower in depth within the profile of the slot 12. The second width 36 is disposed at a depth 30 that is less than the overall depth 28. The largest width 34 opens to a surface of the rotor 10 and is at the shallowest depth 32. The example initial profile 22 is rectangular and can be provided by many different machining methods.

The desired final configuration 26 includes a complex curved path that provides the retention feature matching the root 16 of the plurality of turbine blades 14. The profile 22 of the roughed in slot is much different than the finished profile 26 and therefore much material must be removed.

Figure 4:
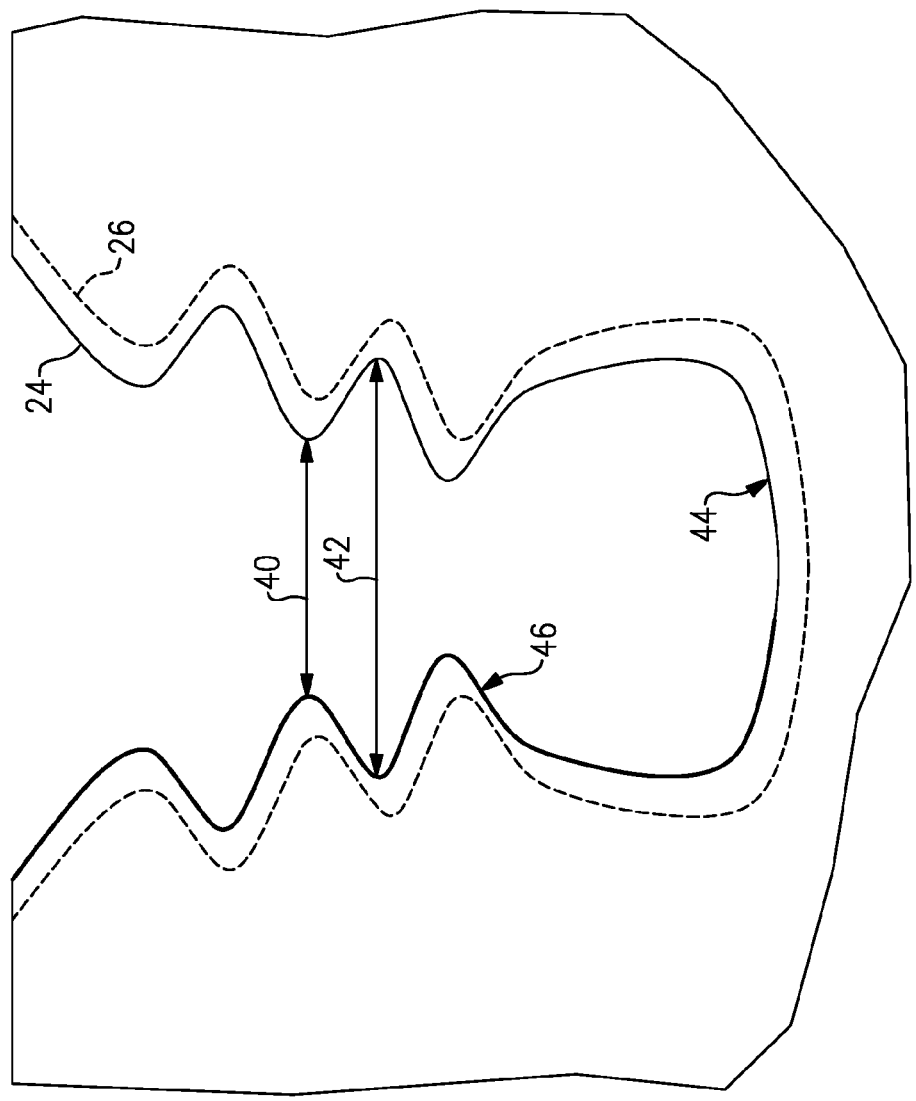
FIG. 4 is a schematic view of a semi finished slot.

Referring to FIG. 4, the profile 22 has now been machined to a semi finished profile 24. The semi finished profile 24 changes the rectangular features generated in the rough slot profile 22 to smooth features that more closely resemble the desired final profile 26. The semi finished profile 24 includes a bottoms surface 44 that is shallower than the desired final bottom profile 26 and also includes under cuts 46.

The semi-finished profile 24 includes ribbed features 40 that alternate between extending inward into the slot and outward width 42. The width 42 is greater than the width 40. However, the width 40 is disposed at a portion within the slot that is shallower than the width 42 thereby generating an undercut.

In the example, a form tool (FIGS. 5A and 5B) 19 is utilized that includes a profile corresponding to the intermediate profile 24. The profile of the machine tool 19 is run through the rough slot 12 to generate the desired intermediate profile 24. This intermediate profile 24 provides a general shape of the desired completed slot.

Figure 5A:
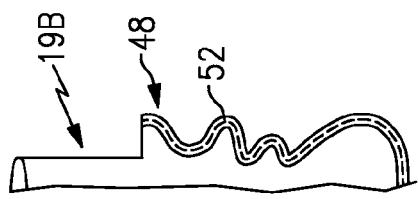
FIG. 5a is a schematic view of an example milling tool for machining the semi finished slot.
Figure 5B:
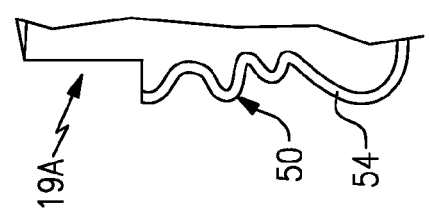
FIG. 5b is schematic view of an example grinding tool for machining the semi-finished slot.

Referring to FIGS. 5A and 5B, the example machine tool 19 can be a milling tool 19*a* or a grinding tool as indicated at 19*b*. The form tool 19*a* illustrated in FIG. 5A is a milling tool 19*a*. The milling tool 19*a* is a cutting tool that includes a profiled surface 50 that includes a cutting edge 54. This cutting edge is fed into the intermediate slot to remove material to provide the desired semi finished profile 24.

Referring to FIG. 5B, a grinding tool 19*b* includes a profile 48. The profile 48 includes a coating 52 that provides an abrasive grit to wear away and remove material to form the desired semi finished slot 24. The entire profile 48 of the grinding tool 19*b* may also be fabricated from an abrasive material that provides the material removal capability desired without the need for an additional abrasive coating.

As is appreciated, in a form tool 19 the entire profile 50 is a cutting surface and therefore significant forces are exerted on the tool. As appreciated, side portions of the machine tool are cutting and removing material while bottom portions of the same tool are cutting bottom surfaces of the slot 12. Therefore, stresses in all directions are exerted on the machine tool that can result in less then desired tool life and performance.

In this process the form tool 19 is utilized to provide only a semi finish slot profile 24. This semi finished slot profile 24 can be generated with the understanding that additional machining processes will be required that can provide the desired finish. The form tool 19 is utilized only to provide a semi finished geometry. The bottom portion 44 of the semi finished profile 24 is not the same as the bottom profile of the finish geometry. Therefore an additional step is required.

Referring to FIGS. 6 and 7, a partially finished profile 60 is generated utilizing another form tool 45. The form tool 45 has a profile that matches the desired finished profile 56 at the slot 60. However, the additional form tool includes a bottom surface 47 that does not machine nor remove material at the bottom surface of the slot 12 to the finished profile 26. The bottom surface 44 is left in an unfinished condition such that the form tool 45 can be designed to provide the desired finishes on the side surfaces of the finished profile only. This example form tool 45 may be a cutting tool or a grinding tool.

Limiting the form tool 45 to forming only the side surfaces of the slot 60 the tool 45 can be run more efficiently with an increased tool life. In this example the semi finished slot 60 includes a finished portion 56 that does not include the bottom surface 44. The bottom surface 44 remains at the intermediate profile 24 or alternatively some profile that is generated short of the desired finished profile 26 of the slot 12.

Figure 9:
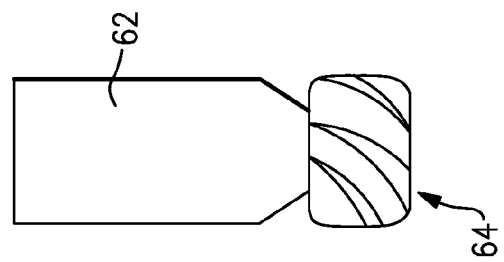
FIG. 9 is a schematic view of an example milling tool for finish machining a portion of the completed slot.
Figure 8:
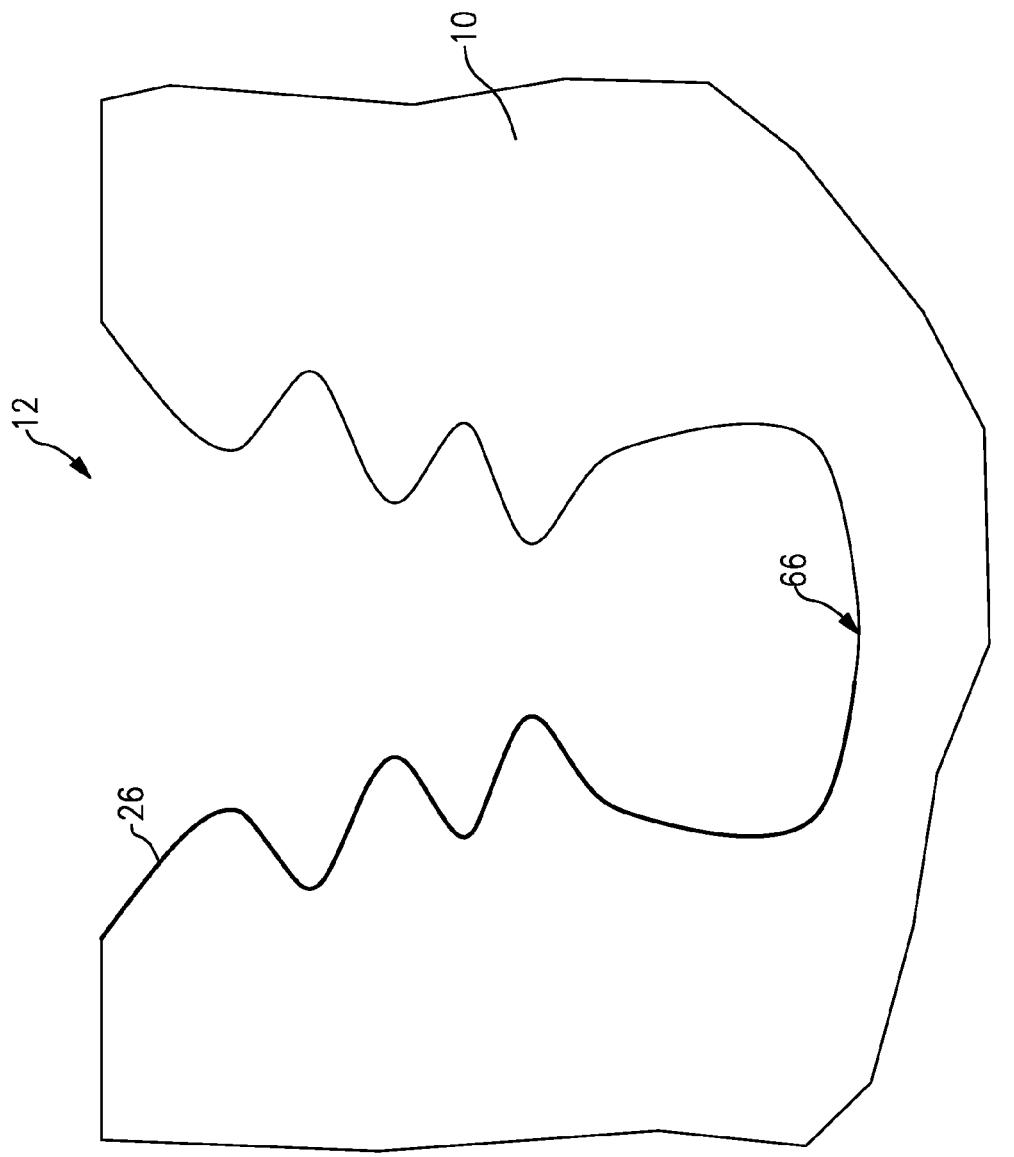
FIG. 8 is a schematic view of a completed slot.

Referring to FIGS. 8 and 9, the completed profile 26 of the slot 12 is formed utilizing a machine tool 62 that removes material only along the bottom portion surface 66 that were not completed or touched during the partial finishing machining stage illustrated in FIG. 6. The tool 62 is an end mill with a cutting surface 64 that provides the desired shape and surface finish for the slot bottom surface 66. The tool 62 utilized for completing the bottom surface 66 includes only the shape required to complete a portion of the completed profile 26.

The example end mill 62 includes the cutting surface 64 that engages only that bottom surface 66 of the slot 12 that had not been machined during the partial finishing stage as illustrated in FIG. 6. As appreciated, it is within the contemplation of this invention that a grinding tool may also be utilized to finish the bottom portion of the slot depending on the specific desired configuration of the finished slot profile 26.

Figure 11:
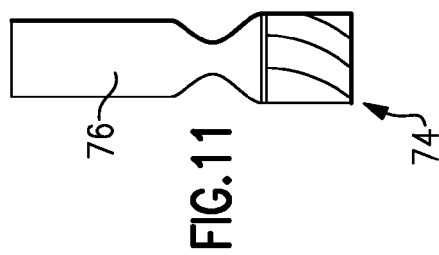
FIG. 11 is a schematic view of another example milling tool for finish machining a portion of the completed slot.
Figure 10:
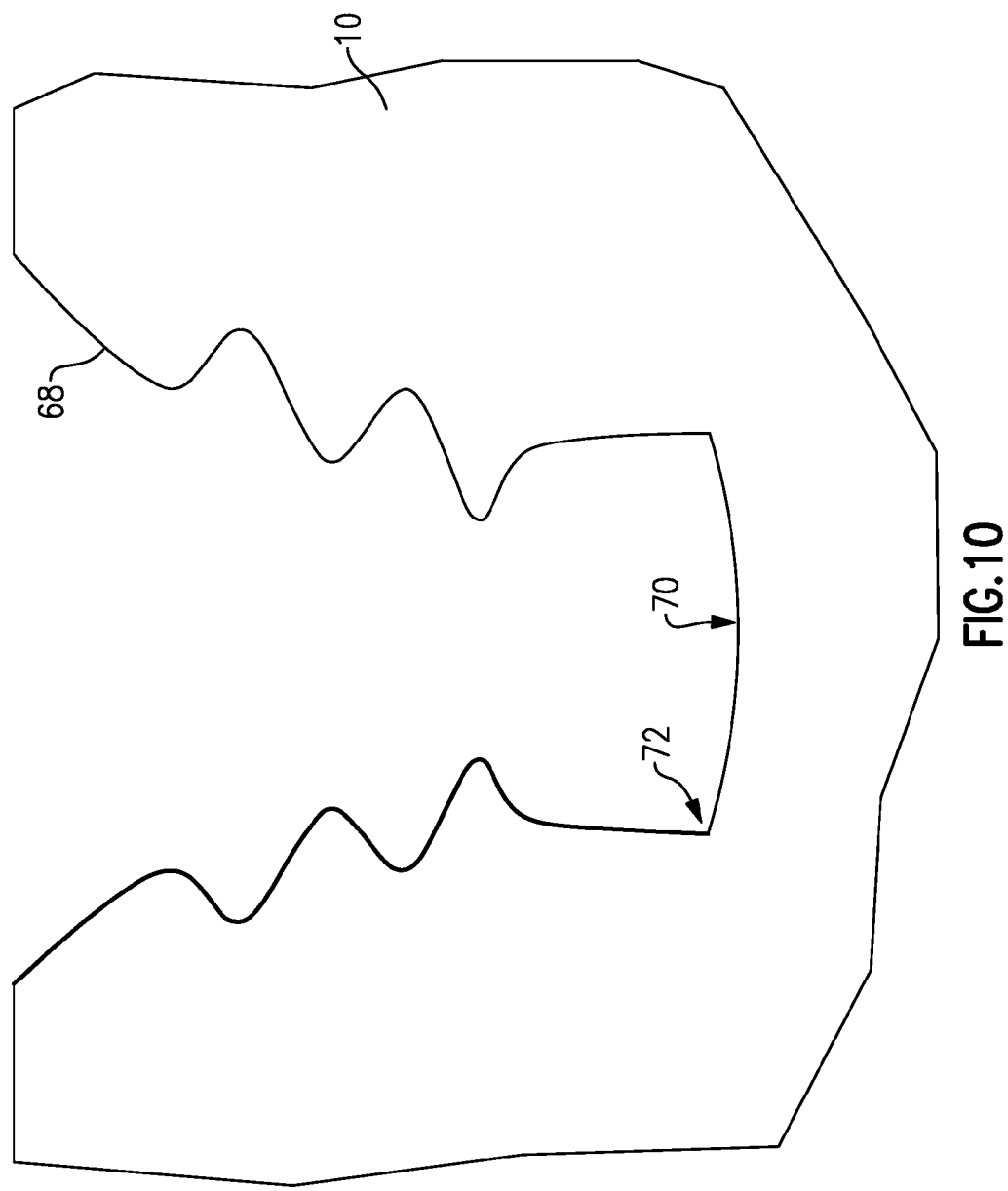
FIG. 10 is a schematic view of another example finished slot.

Referring to FIGS. 10 and 11, another completed slot profile 68 is shown that includes a bottom surface 70 that includes a very small radius or inner corner 72. An interface between the side surface and the bottom surface 70 of the slot profile 68 in final form includes the small radii inner corner 72. This bottom radius 72 cannot be formed utilizing grinding methods or other abrasive techniques; therefore, the finished profile 68 is generated by an end mill cutting tool 76 that is specifically designed with a cutting shape 74 to form the corner radius 72.

A grinding tool is not capable of providing the small radius desired in the slot configuration shown in FIG. 10. This is because a grinding utilizes an abrasive grit to provide for a material of removal. The small surface area required to perform the small radius inner corner 72 does not have sufficient surface area to hold or apply sufficient number of abrasive grits to the area to form the corner with a surface finish within desired parameters and still provide an acceptable tool life.

Accordingly, the process of this invention utilizes cutting tools and abrasive grit tools to form portions of a turbine disk slot within a rotor. The end mill cutter and abrasive grit material forming tools are utilized to form only portions of a desired finished shape of the rotor disk slot. A milling tool is utilized to finish the bottom portion of the slot separate from the other finishing tools to provide a desired surface finish and configuration of the bottom of the turbine slot that corresponds with the overall surface finishing and geometry of the completed turbine slot. Using a separate tool to form the bottom slot increases tool life and provides for the formation of geometries not possible utilizing cutting tools that form the entire slot or not possible through the use of abrasive grit tools.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of manufacturing a turbine disk, comprising the steps of:
    forming a slot in an initial form in a turbine disk;
    removing material from the turbine disk from surfaces defining the slot to an intermediate finished form using a machine tool;
    machining side surfaces of the slot to a partial final form using a first cutting tool, wherein only the side surfaces of the slot are machined to the partial final form using the first cutting tool; and
    machining only a bottom surface of the slot to a completed final form using an end mill that is different than the first cutting tool.

2. The method of claim 1 further comprising forming the initial form of the slot using one of a milling tool and a grinding tool.

3. The method as recited in claim 1, wherein the first cutting tool comprises one of a milling tool and a grinding tool.

4. The method as recited in claim 1, including a plurality of slots formed along the outer periphery of the turbine disk.

5. The method as recited in claim 1, wherein the completed final form includes an interface with the side surfaces.

6. A method of manufacturing a turbine disk, comprising the steps of:
   machining a slot to an initial form in a turbine disk using a first cutting tool, the cutting tool creating a rough slot;
   machining the slot to an intermediate form using a second cutting tool different from the first cutting tool, the second cutting tool creating a semi-finished slot;
   machining side surfaces of the slot to a final form using a third cutting tool different from the first cutting tool and the second cutting tool, wherein the third cutting tool machines only the side surfaces of the slot to a desired final form; and
   machining only a bottom surface of the slot to a final form using an end mill different than the first, second and third cutting tools.

7. The method as recited in claim 6 wherein the first cutting tool comprises a mill providing a stepped slot as the initial form.

8. The method as recited in claim 7, wherein the second and third cutting tools comprise one of a milling tool and a grinding tool.

9. The method as recited in claim 8, wherein the second cutting tool comprises a grinding tool including a shape determined to produce the semi-finished slot.

10. The method as recited in claim 8, wherein the third cutting tool comprises a grinding tool including a shape determined to produce a first portion of the slot in final form.

11. The method as recited in claim 6, wherein an interface between the side surfaces of the slot and the bottom surface of the slot in the final form comprise a small radii.

12. The method as recited in claim 6, wherein machining the bottom surface of the slot includes machining the bottom surface between the side surfaces.

* * * * *